(12) United States Patent
Toebes

(10) Patent No.: US 8,626,496 B2
(45) Date of Patent: Jan. 7, 2014

(54) METHOD AND APPARATUS FOR ENABLING PLAYBACK OF AD HOC CONVERSATIONS

(75) Inventor: John A. Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 124 days.

(21) Appl. No.: 13/180,738

(22) Filed: Jul. 12, 2011

(65) Prior Publication Data
US 2013/0018654 A1    Jan. 17, 2013

(51) Int. Cl.
*G10L 21/00* (2013.01)

(52) U.S. Cl.
USPC ........................................................ 704/201

(58) Field of Classification Search
USPC ........................................................ 704/201
See application file for complete search history.

(56) References Cited

U.S. PATENT DOCUMENTS

| | | | |
|---|---|---|---|
| 4,866,758 A * | 9/1989 | Heinzelmann | 379/93.15 |
| 6,072,645 A | 6/2000 | Sprague | |
| 6,947,528 B1 | 9/2005 | Ko | |
| 7,023,970 B1 | 4/2006 | Sealey | |
| 7,061,902 B1 * | 6/2006 | Fukuyama et al. | 370/352 |
| 7,590,230 B1 * | 9/2009 | Surazski | 379/202.01 |
| 7,962,340 B2 * | 6/2011 | Comerford | 704/253 |
| 2004/0081292 A1 | 4/2004 | Brown | |
| 2005/0020223 A1 * | 1/2005 | Ellis et al. | 455/186.1 |
| 2006/0241948 A1 * | 10/2006 | Abrash et al. | 704/275 |
| 2009/0157396 A1 * | 6/2009 | Bjarnason | 704/211 |
| 2010/0158203 A1 * | 6/2010 | Mikan | 379/68 |
| 2010/0274796 A1 | 10/2010 | Beauregard | |
| 2010/0322392 A1 * | 12/2010 | Walker et al. | 379/88.11 |
| 2011/0131276 A1 | 6/2011 | Cadou | |

OTHER PUBLICATIONS

Ramsey et al (hereinafter Ramsey) "The Promising Future for FDRs and CVRs", Apr. 1, 2000, available at http://www.aviationtoday.com/av/commercial/The-Promising-Future-for-FDRs-and-CVRs_12615.html.*
Personal Call Recorder, Automatic Record calls on Your PC-User's Guide) publically available on http://web.archive.org/web/*/www.digital-loggers.com/pl%20manual.pdf as of Dec. 24, 2010) by Digital Loggers, Inc.*

* cited by examiner

*Primary Examiner* — Jialong He
*Assistant Examiner* — Jie Shan
(74) *Attorney, Agent, or Firm* — P. Su

(57) ABSTRACT

In one embodiment, a method includes monitoring activity in an environment, and storing a snippet of the monitored activity. Monitoring the activity in the environment includes operating a device arranged to capture the activity between approximately a first time and approximately a second time. The snippet has a particular duration that is arranged to end at approximately the second time. The method also includes storing the snippet in a storage module and determining when a request to provide the snippet is obtained from a party. If it is determined that the request to play the snippet is obtained, the method includes accessing the storage module to obtain the snippet and providing the snippet to the party if it is determined that the request to provide the snippet is obtained.

20 Claims, 6 Drawing Sheets

METHOD AND APPARATUS FOR ENABLING PLAYBACK OF AD HOC CONVERSATIONS

The disclosure relates generally to monitoring interactions or exchanges in an environment and, more specifically, to enabling playback of the interactions occurring within the environment without the need to plan in advance to record and/or to store the interactions.

BACKGROUND

When planning or initiating a conference call, a conference call organizer may decide to record the conference call. Recording the conference call, and storing the recording, allows the conference call to be played back at a later time. For example, an individual who was unable to participate in the conference call, but needs to become acquainted with topics discussed during the conference call, may obtain the recording of the conference call and play back the recording.

In general, meetings may be recorded by activating a device to record the meetings. By way of example, meetings may be recorded by turning on recording devices including, but not limited to including, tape recorders, digital recorders, and/or computer-based applications that record.

To record a meeting or a conference call, pre-planning is generally required. That is, a decision must be made to turn on a recording device, or to enable recording functionality, in order to cause a meeting to be recorded. In some instances, a decision to record a meeting may be made during the meeting based upon a determination, made during the course of the meeting, that important subject matter is being discussed in the meeting. When a decision to record a meeting is not made until after the meeting has commenced, any portions of the meeting which occurred prior to the decision to record the meeting are not captured in a recording. Thus, important discussions during a meeting which prompted a decision to record the meeting may not be captured in a recording.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1A:
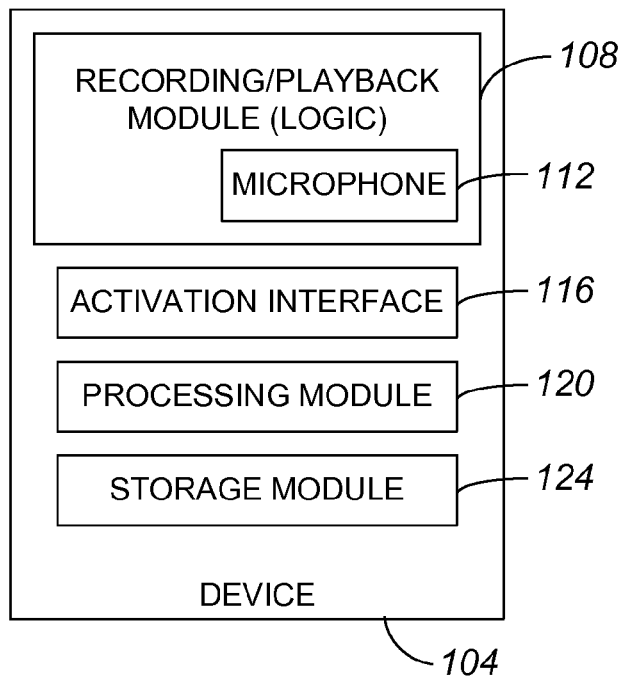
FIG. 1A is a block diagram representation of a device that is capable of recording and playing back a recent portion of activity occurring in an environment in accordance with an embodiment.

According to one aspect, a method includes monitoring activity in an environment, and storing a snippet of the monitored activity. Monitoring the activity in the environment includes operating a device arranged to capture the activity between approximately a first time and approximately a second time. The snippet has a particular duration that is arranged to end at approximately the second time. The method also includes storing the snippet in a storage module and determining when a request to provide the snippet is obtained from a party. If it is determined that the request to play the snippet is obtained, the method includes accessing the storage module to obtain the snippet and providing the snippet to the party if it is determined that the request to provide the snippet is obtained.

Description

During the course of a conversation such as an ad hoc or otherwise unplanned conversation, it is not unusual for participants to wish to "replay" a portion of the conversation. For example, a participant may be unable to recall exactly what he said during the course of a conversation, and wish that there was a way for him to either listen to what he said or read a transcript of what he said. Although it is possible to record a conversation and to listen to a recording of the recorded conversation, recording a conversation typically requires pre-planning, e.g., a recorder must be activated prior to the beginning of the conversation. As many conversations are unplanned, many conversations are often not recorded.

In one embodiment, a microphone may be activated such that the microphone captures a conversation, and a recent portion of the captured conversation may be stored such that the recent portion may be played back or otherwise provided to a party by request. By way of example, if a microphone monitors or captures a conversation and a most recent snippet of the conversation is stored, then a participant who is unable to recall exactly what he recently said in a conversation may access the most recent snippet and "play back" the snippet. Substantially only a recent portion of a conversation captured by a microphone is stored. The ability to access a recent portion of a conversation contained in a snippet, and to request a playback of the snippet, allows a user to effectively replay the recent portion of the conversation substantially without having to plan ahead to record the conversation.

Many environments such as office environments contain devices that include microphones. For instance, many telephone devices include microphones. A microphone in an office environment may be activated such that the microphone may monitor or capture conversations in the office environment. A snippet of the captured conversation may be created, stored, and updated such that the snippet substantially always contains the most recent portions of the captured conversation. By way of example, a snippet may be updated to substantially always contain the last N seconds of an ongoing conversation. Thus, any portions of the ongoing conversation that occur earlier than the last N seconds are effectively not stored.

A snippet that is stored in memory and is accessible for playback is generally the most recent snippet of activity. For example, if a snippet has a predetermined duration that is approximately 30 seconds, then the snippet that is stored will generally include the most recent 30 seconds of activity. Hence, the snippet stored in memory varies dynamically such that as new activity is captured, older stored activity is effectively purged such that a snippet substantially always maintains a predetermined duration and includes the most recent activity. Any data pertaining to older stored activity, e.g., any data that is older than a current capture interval, may be discarded.

In one embodiment, a user may be provided with the ability to play back or save a recent portion of activity, e.g., audio and/or visual activity, substantially without having to previously plan to record the activity using substantially any device with recording capabilities. A phone that is placed at a location, for example, may be used to provide the ability to play back or save activity. When audio is to be captured, substantially any device that includes a microphone may be utilized. A microphone may, for example, be arranged to constantly be on to record audio or sounds in a surrounding environment.

Referring initially to FIG. 1A, a block diagram representation of a device that is capable of recording and playing back a recent portion of activity occurring in an environment will be described in accordance with an embodiment. A device 104 generally includes a module 108 that is arranged to record or otherwise capture activities associated with an environment, e.g., an environment in which device 104 is placed. Module 108 may include logic, e.g., hardware logic and/or software logic. Device 104 may be, but is not limited to being, a telephone device that is connected to a communications network, a computing system that is connected to a communications network, or a standalone computing system that is not connected to a communications network.

Module 108 is generally arranged to provide recording/playback functionality. That is, module 108 is configured to allow for the capture of activities within an environment, the storage of a most recent snippet of the captured activities, the processing of a request to access the most recent snippet, and the playback of the most recent snippet. In one embodiment, module 108 is arranged to provide recording and playback functionality associated with activities that include an audio component, e.g., conversational activities. Hence, module 108 includes a microphone device 112 that is arranged to capture audio. It should be appreciated that microphone device 112 may be arranged to be remotely activated, as for example by an owner who is not at the location at which device 104 is located and desires to capture activities at the location.

Device 104 further includes an activation interface 116, a processing module 120, and a storage module 124. Activation interface 116 typically includes a user interface that cooperates with module 108 to activate playback functionality. By way of example, activation interface 124 may include a physical mechanism such as a button or a switch that may be activated to cause a recent snippet to be accessed. It should be appreciated that the recent snippet has a duration that is approximately the length of a capture interval, and that the recent snippet ends at approximately the time that activation interface 124 is activated. Causing a recent snippet to be accessed may include causing the recent snippet to be played such that a party may listen to the recent snippet and/or causing a file containing the recent snippet to be provided to the party such that the party may play the recent snippet. Processing module 120 is generally arranged to execute logic such as software logic associated with module 108 and activation interface 116. Storage module 124, which may be a memory arrangement, is configured to store data such as data associated with a recent snippet.

Figure 1B:
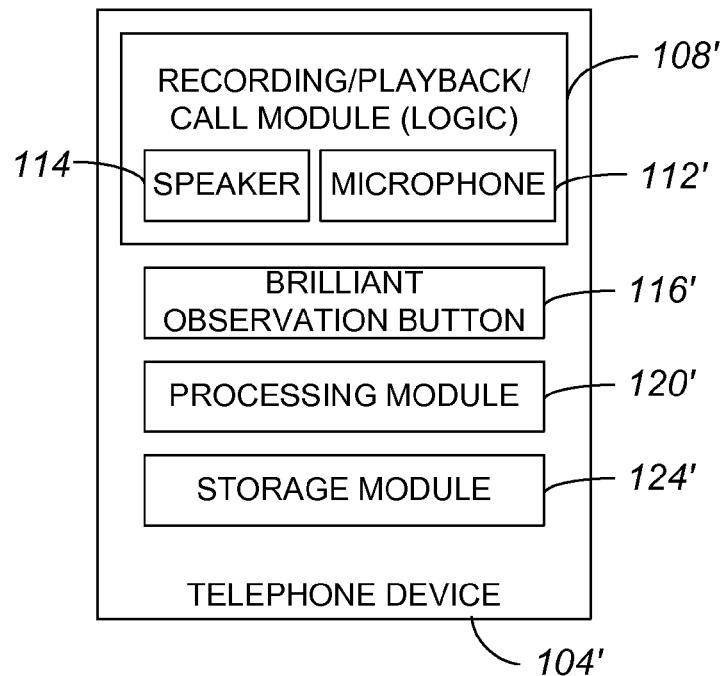
FIG. 1B is a block diagram representation of a telephone device that is capable of recording and playing back a recent portion of activity occurring in an environment in accordance with an embodiment.

As mentioned above, device 104 may be a telephone device. In one embodiment, device 104 may be an Internet protocol (IP) phone, as for example an IP phone located in an office environment. FIG. 1B is a block diagram representation of a telephone device such as an IP phone that is capable of recording and playing back a recent portion of activity occurring in an environment in accordance with an embodiment. A telephone device 104' includes a module 108' that is arranged to record or otherwise capture activities associated with an environment, e.g., a location in which telephone device 104' is placed. Module 108' may include hardware logic and/or software logic.

Module 108' is generally arranged to provide recording, playback, and call functionality. Module 108' is configured to allow for the capture of activities within an environment, the storage of a most recent snippet of the captured activities, the processing of a request to access the most recent snippet, and/or the playback of the most recent snippet. In addition, module 108' is configured to allow telephone device 104' to generally function as a telephone, and typically includes a communications interface such as an input/output port. For example, module 108' generally includes logic arranged to allow a call to be placed, to allow a call to be answered, and to enable participation in a call. In one embodiment, module 108' may include functionality associated with participation in conference calls.

Module 108' includes a microphone device 112' that is arranged to capture audio, as well as a speaker 114 that is arranged to facilitate the playback of a recent snippet. The audio captured by microphone device 112' may be audio associated with a call, or audio associated with activities that occur in the environment in which telephone device 104' is located.

A "brilliant observation button" (BOB) button 116', a processing module 120', and a storage module 124' are also included in module 108'. BOB button 116' is arranged to be activated to initiate a playback of a recent snippet. In one embodiment, upon activating BOB button 116', as for example by pressing BOB button 116', the playback of a recent snippet that is stored in storage module 124' substantially automatically commences. Alternatively, activating BOB button 116' may cause a menu to be activated that enables a user to select whether to commence playback of a recent snippet or to send the recent snippet to the user, or another party, in a voicemail or an email. In general, activating BOB button 116' effectively triggers a request for access to the recent snippet stored in storage module 124' Processing module 120' is generally arranged to execute logic such as software logic associated with module 108 and software associated with BOB button 116'. Storage module 124, which may be a memory arrangement, is configured to store data such as data associated with a recent snippet. Although storage module 124 is shown as being included on telephone device 104' and, hence, is local to telephone device 104', it should be appreciated that a storage module may instead be accessible to telephone device 104', but remote with respect to telephone device 104'.

Figure 2:
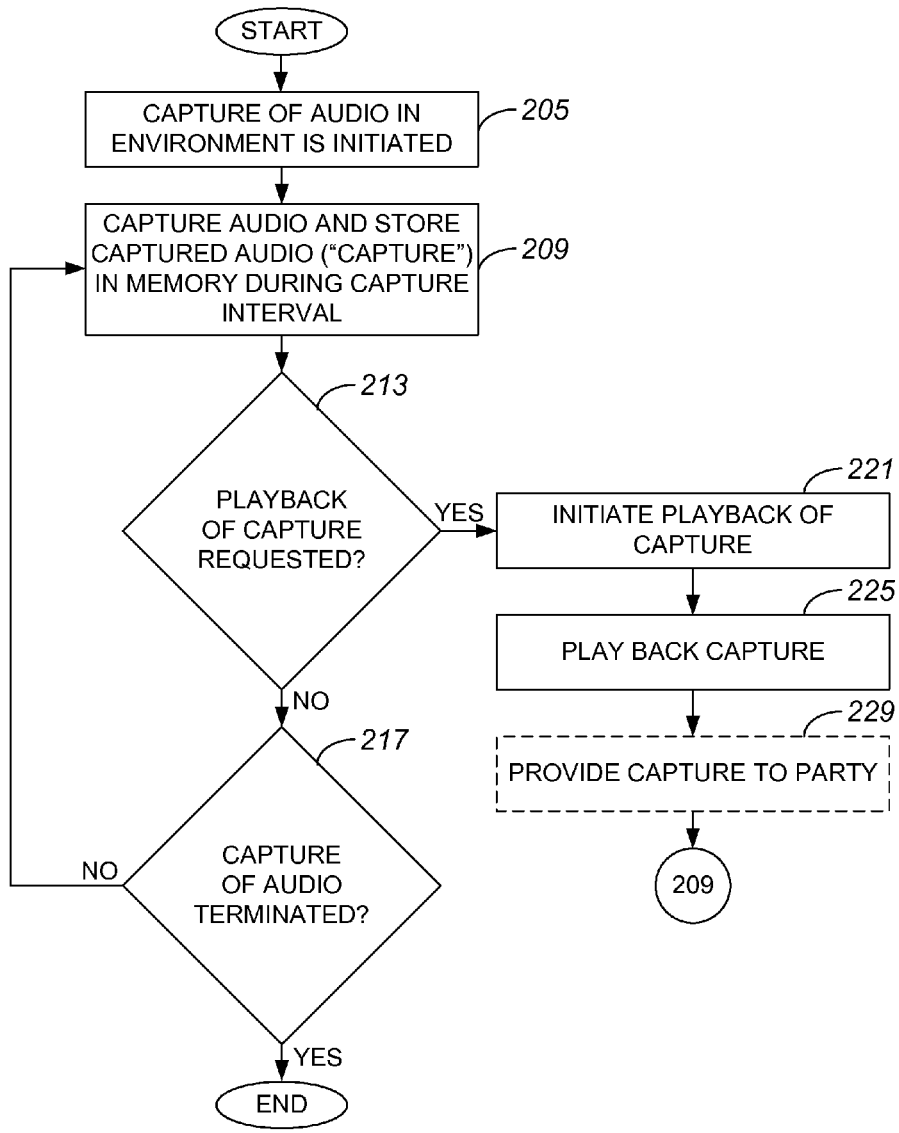
FIG. 2 is a process flow diagram which illustrates a first method of utilizing a system that captures and records sounds for playback in accordance with an embodiment.

With reference to FIG. 2, a method of utilizing a system, as for example a telephone device such as an IP phone, that captures and records audio for playback will be described in accordance with an embodiment. A method 201 of utilizing a system that captures and records audio begins at step 205 in which the capture of audio, e.g., audio within a particular environment, is initiated. Initiating the capture of audio may include a party using a user interface to request that audio be captured, and/or may include activating a microphone. It should be appreciated, however, that initiating the capture of audio may instead be substantially automatic. In one embodiment, upon initiating the capture of audio, an indication may be provided such that parties present in the environment may be aware that audio is being captured, e.g., that conversations are effectively being monitored. An indication may be, but is not limited to being, a visual indication, such as a light associated with the system that is illuminated when audio is being captured, or an audio indication, such as a tone that may be played. An indication may also include a sign in a building, e.g., at an entrance of the building, which indicates that recording may be in progress or that all conversations within the building may be subject to being recorded.

Once the capture of audio is initiated, audio is captured, and the captured audio is stored in memory associated with the system in step 209. The captured audio that is stored, i.e., the "capture," has a duration that is the length of a capture interval. In other words, the snippet of audio that is stored has a time length that is generally no longer than a capture interval. The capture interval effectively defines the length of a snippet of the capture that is to be stored in memory. In general, the capture interval may have any suitable length, as for example a length of between approximately 30 seconds and approximately 120 seconds. The capture interval may be variable, and may be altered at substantially any time. Storing captured audio in memory may include identifying a portion of the memory allocated to store the capture.

A determination is made in step 213 as to whether a playback of the capture has been requested. Such a determination may involve determining whether an input has been received from a party, e.g., a user or owner of the system. An input may include, but is not limited to including, an actuation of a BOB button.

If the determination in step 213 is that a playback of the capture is not requested, then process flow moves to step 217 in which it is determined if more audio is to be captured. That is, it is determined in step 217 if the capture and storage of audio is terminated. The capture and storage of audio may be terminated substantially automatically, e.g., when a predetermined amount of time has elapsed, or may be terminated upon obtaining a cue from a user or owner of the system. If the determination is that the capture of audio is not terminated, process flow returns to step 209 in which audio continues to be captured and stored. Alternatively, if the determination in step 217 is that the capture of audio has been terminated, the method of utilizing a system that captures and records audio is completed. As will be appreciated by those skilled in the art, the capture that is stored in the memory may be erased when the capturing and recording of audio is completed.

Returning to step 213, if it is determined that playback of the capture is requested, then in step 221, then a playback of the capture is initiated. In one embodiment, a initiating a playback of the capture may involve providing a notification or other indication that a playback has been initiated. For example, a message may be sent to a user or owner of the system, or an audio or visual indication may be provided, to inform a user or owner that playback has been initiated. After a playback of the capture is initiated, the capture is played back in step 225. In one embodiment, while a capture is being played back, no further capture of audio occurs. That is, recording audio is effectively on hold during playback. Playing back the capture may include outputting audio associated with the capture on a speaker or similar arrangement.

In an optional step 229, the capture is provided to a party, e.g., the party that requested playback and/or a user of the system. Providing the capture to a party may include, but is not limited to including, transmitting an email that includes the capture or a representation of the capture to the party, transmitting a voicemail that includes the capture or a representation of the capture to the party, and providing the capture or a representation of the capture in a file that is accessible to the party. It should be appreciated that a representation of the capture may be, in one embodiment, a text representation of the capture. Once the capture is played back in step 225, or after the capture is optionally provided to the party in step 229, process flow returns to step 209 in which audio continues to be captured and stored in a memory.

Figure 3:
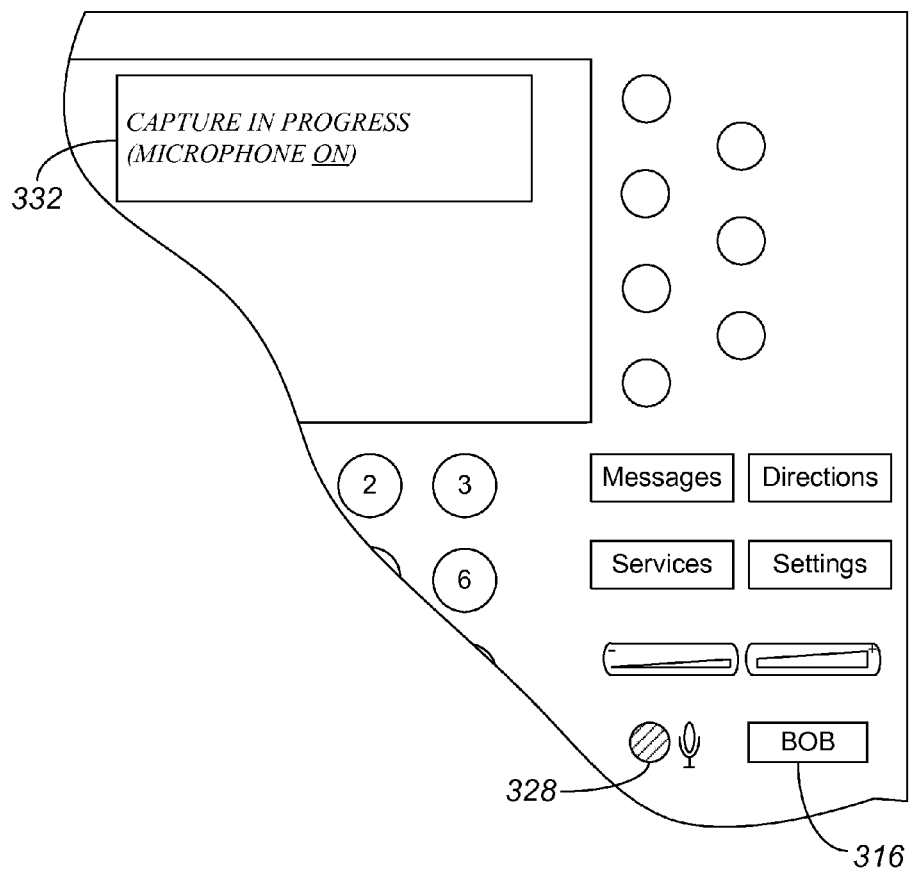
FIG. 3 is a diagrammatic representation of a part of a telephone that includes a mechanism, e.g., a button, that allows playback of a recorded snippet of a conversation in accordance with an embodiment.

As previously mentioned, a system that is arranged to capture activities in an environment may be a phone such as an IP phone. FIG. 3 is a diagrammatic representation of a part of a phone that includes a mechanism, e.g., a button, that allows playback of a recorded snippet of a conversation in accordance with an embodiment. A phone 304, e.g., an IP phone, is generally part of a communications network (not shown). Thus, phone 304 may be used to initiate calls, to answer calls, and to participate in calls.

Phone 304 includes a display 332. Display 332 may generally display information including, but not limited to including, a date, a time, a phone number associated with the phone, a phone number from which a call is received, a phone number to which a call is placed, an indication of whether a call was missed, and/or an indication of a number of voicemail messages associated with the phone. In the described embodiment, display 332 may display a message which indicates that a capture of audio is in progress (as shown) and/or an indication that a playback of a capture or a snippet is in progress.

Phone 304 includes a BOB button 316 that may be activated or actuated, e.g., pressed, to initiate a playback of a shored snippet. It should be appreciated that when BOB button 316 is activated, display 332 may indicate that BOB button 316 is activated. For example, the activation of BOB button 316 may lead to the display of a message indicating that playback of a snippet is in progress. In lieu of activating BOB button 316, BOB functionality may instead by activated by a star code, e.g., *42 or *262.

An indicator 328, which may be a visual indicator such as a light emitting diode (LED), may be arranged to indicate that a microphone (not shown) associated with phone 304 is active. When a microphone (not shown) is active and, hence, monitoring or capturing activities in an environment associated with phone 304, In one embodiment, indicator 328 may be substantially integrated into a button or other mechanism (not shown) that may be used to turn on a microphone (not shown).

Figure 4A:
FIG. 4A is a diagrammatic representation of a timeline at a time t0 at which the capture of sound begins in accordance with an embodiment.

With reference to FIGS. 4A-D, one process of capturing audio and playing back a stored snippet of the audio will be described in accordance with an embodiment. FIG. 4A is a diagrammatic representation of a timeline at a time t0 at which the capture of audio begins in accordance with an embodiment. As shown on a timeline 450, at a time t0 454a, the capture of sound begins. In the described embodiment, the capture of sound may begin when a microphone or other recording device, e.g., a microphone associated with a phone, is activated to capture sound in an environment in which the microphone or other recording device is placed. A microphone may be activated in response to a command from a user, for example.

Once the capture of sound begins at time t0 454a, a snippet of the captured sounds is stored. In general, the snippet that is stored has a duration that is effectively defined by a capture interval, as mentioned above. The capture interval is associated with a length of a snippet that is to be stored. For example, if a capture interval is approximately 30 seconds, then a snippet of a length of approximately 30 seconds is stored in memory and is accessible for playback. The capture interval is associated with a sliding window. Hence, a snippet that has a duration substantially defined by a capture interval is associated with a most recent portion of captured sound. By way of example, regardless of how much time has elapsed since time t0 454a, a snippet has a duration that is at most approximately equal to the capture interval and includes the most recently captured sounds.

Figure 4B:
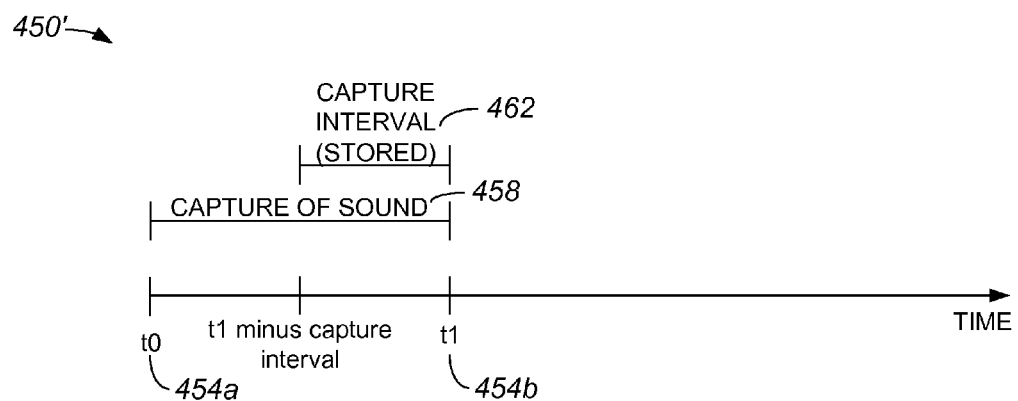
FIG. 4B is a diagrammatic representation of a timeline, e.g., timeline 450 of FIG. 4A, at a time t1 at which a snippet of captured sound has been stored in accordance with an embodiment.

FIG. 4B shows timeline 450 at a time t1 at which a snippet of captured sound has been stored in accordance with an embodiment. At a time t1 454b, the capture of sound is ongoing and sound has been captured for a duration 458 that extends from time t0 454a to time t1 454b. In the embodiment as shown, a capture interval has a duration that is less than duration 458. Thus, a stored snippet 462 has a duration that is substantially equal to the duration defined by the capture interval, and contains sound captured during a recent period of time that ends at time t1 454b. In other words, stored snippet 462 includes sounds captured beginning at a time that substantially begins at t1 454b "minus" the capture interval.

Figure 4C:
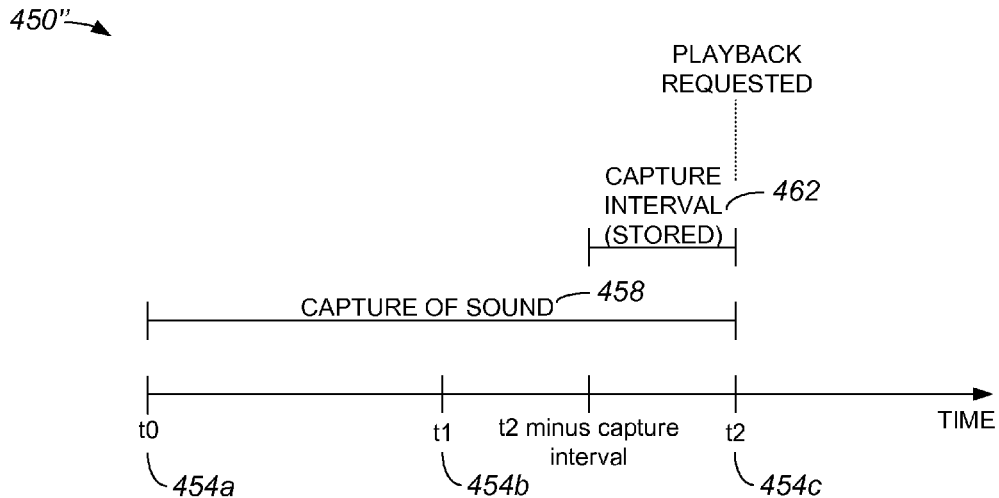
FIG. 4C is a diagrammatic representation of a timeline, e.g., timeline 450 of FIG. 4A, at a time t2 at which playback of a snippet of captured sound is requested in accordance with an embodiment.

At a time t2 454c, as shown in timeline 450" of FIG. 4C, playback of snippet 462 is requested. At time t2 454c, sound has been captured for duration 458 which began and time t0 454a, and snippet 462 corresponds to sounds captured in a capture interval that ends at approximately time t2 454c. Thus, at time t2 454c, snippet 462 contains different contents than snippet 462 contained at time t1 454b. It should be understood that while the length of the capture interval generally remains substantially the same, e.g., the length of the capture interval is the same at time t1 454b and at time t2 454c, the capture interval may be changed if, for example, it is decided during the course of capturing sound that a capture interval of a different length is desired.

Figure 4D:
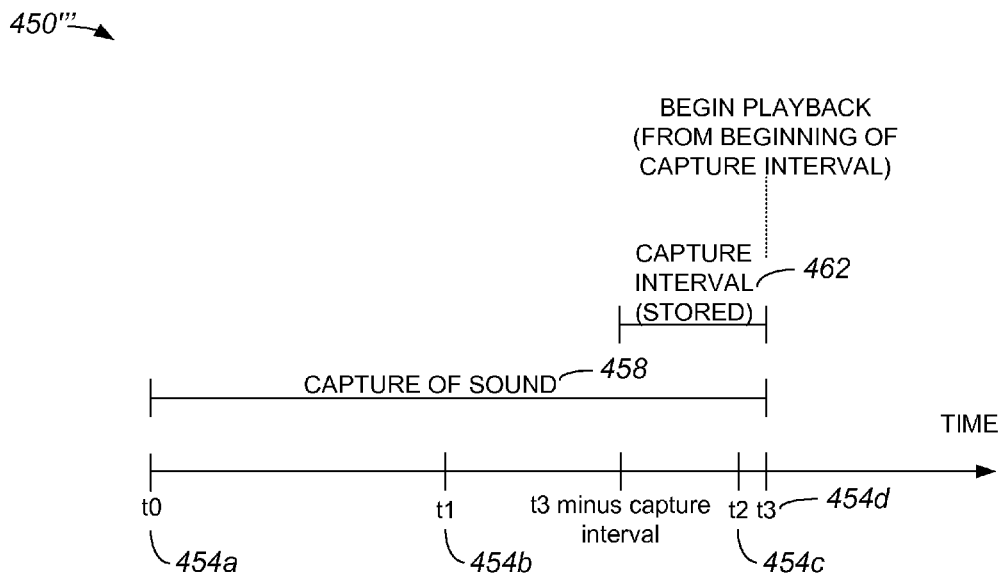
FIG. 4D is a diagrammatic representation of a timeline, e.g., timeline 450 of FIG. 4A, at a time t3 at which playback of a snippet of captured sound begins in accordance with an embodiment of the present invention.

In general, once a playback is requested, snippet 462 is substantially immediately accessed and playback begins. As shown in FIG. 4D, at a time t3 454d, playback begins. Although the elapsed time between time t2 454c and time t3 454d is generally negligible, the gap between time t2 454c and time t3 454d has been emphasized for purposes of illustration. The playback of snippet 462 begins at time t3 454d.

Figure 5:
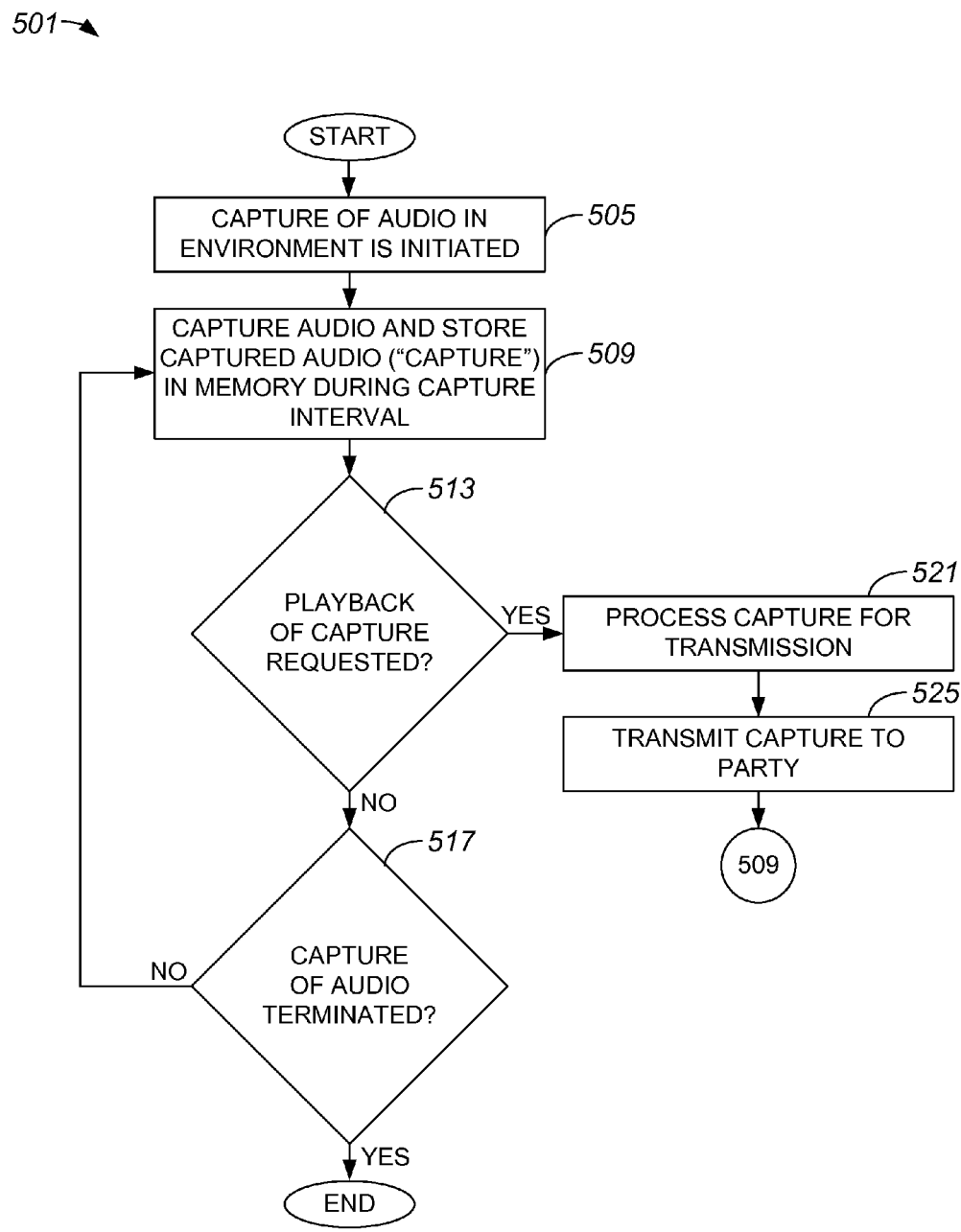
FIG. 5 is a process flow diagram which illustrates a second method of utilizing a system that captures and records sounds for playback in accordance with an embodiment.

While activating a playback button such as a BOB button has been described as causing a stored snippet to be played back, activating a playback button may instead cause other events to occur without departing from the spirit or the scope of the disclosure. For instance, when a party activates a playback button, a text transcript of the stored snippet may be made and sent to the party, e.g., as inline text in an email message or as a file attached to the email message. Alternatively, activating the BOB button may cause the stored snippet to be provided to the party as a voicemail message or as an audio file. FIG. 5 is a process flow diagram which illustrates a method of utilizing a system, as for example a telephone device such as an IP phone, that captures and records audio for transmission will be described in accordance with an embodiment. A method 501 of utilizing a system that captures and records audio begins at step 505 in which the capture of audio, e.g., audio within a particular environment, is initiated.

Initiating the capture of audio may include a party using a user interface to request that audio be captured, and/or may include activating a microphone. In one embodiment, after initiating the capture of audio, an indication may be provided such that observers in the environment may be aware that audio is being captured, e.g., that conversations are effectively being monitored. It is important to note that for security reasons, it may be preferable for the initiation of a capture of audio to occur from a physical location and not from a remote location.

Once the capture of audio is initiated, audio is captured, and the capture is stored in memory associated with the system in step 509. The capture interval may be variable, and may be altered at substantially any time. Storing captured audio in memory may include identifying a portion of the memory allocated to store the capture.

It is determined in step 513 as to whether a playback of the capture has been requested. Such a determination may involve determining whether an input has been received from a party, e.g., a user or owner of the system. An input may include, but is not limited to including, an actuation of a BOB button. If the determination in step 513 is that a playback of the capture is not requested, then process flow moves to step 517 in which it is determined if more audio is to be captured. In other words, it is determined in step 517 if the capture and storage of audio is terminated. The capture and storage of audio may be terminated substantially automatically, or may be terminated upon obtaining a cue from a user or owner of the system. If the determination is that the capture of audio is not terminated, process flow returns to step 509 in which audio continues to be captured and stored. Alternatively, if the determination in step 517 is that the capture of audio has been terminated, the method of utilizing a system that captures and records audio is completed.

Returning to step 513, if it is determined that playback of the capture is requested, then in step 521, then the indication is that a user or owner or the system desires the ability to play back the capture. Accordingly, process flow moves from step 513 to step 521 in which the capture is processed for transmission. Processing the capture may include, but is not limited to including, creating a text transcript of the capture, generating an email message that includes the text transcript and/or a file containing the capture, generating a text message that includes the text transcript, and/or creating a voicemail message that includes the capture. After the capture is processed, the capture is transmitted to a user or owner of the system in step 525. In general, the capture is provided to the party that requested playback of the capture. It should be appreciated that for security purposes, the capture may generally be provided substantially to the owner or user of a device that is used to obtain the capture. Providing the capture to a party may include, but is not limited to including, transmitting an email that includes the capture or text transcript of the capture to the party and/or transmitting a voicemail that includes the capture. Once the capture transmitted in step 525, process flow returns to step 509 in which audio continues to be captured and stored in a memory.

Although only a few embodiments have been described in this disclosure, it should be understood that the disclosure may be embodied in many other specific forms without departing from the spirit or the scope of the present disclosure. By way of example, while capturing and storing sound has been described, other activities may also be captured and stored for playback. Other activities that may be captured and stored include, but are not limited to including, video and/or photographs. Video and/or photographs may be captured and stored for later playback. Such video and/or photographs may be captured using a video recording device such as a camera, or a computer-based application that cooperates with a camera of a computer to record video. It should be appreciated that when activities are captured and stored for security purposes, the use of video or photographs taken within an environment may provide extra security over recording sound in the environment.

Audio that is captured may be provided over a communications link to voice mailbox associated with a phone, in lieu of or in addition to, being stored. For example, in lieu of storing and refreshing a snippet of audio, the snippet of audio may be processed substantially as being a voice mail message, and provided to the voice mailbox of a party. In one embodiment, substantially all captured audio may be processed as voice mail and provided to a voice mailbox.

As mentioned above, in addition to in lieu of providing a snippet that includes audio to a party, a text transcript of the audio included in the snippet may be provided to the party. For instance, for an embodiment in which a request for playing back a snippet initiates sending the snippet to a party, the snippet may be processed by a text transcription application in order to generate a text transcript, and the text transcript may be provided to the party.

The use of a playback button or similar playback interface generally allows for a party, e.g., the owner or occupant of an office, to play back a snippet of conversation occurring in the office during the most recent capture interval. In order to reduce the likelihood that an unauthorized party may access the playback button, the owner or occupant of the office may be notified when the playback button is activated. Notifying the owner or occupant of the office may include, but is not limited to including, sending a notification email, calling a phone of the owner or occupant, and/or causing the activation of the playback button to provide an audio notification or a video notification. If the playback button is implemented on a phone, and the phone has an associated camera, the activation of the playback button may cause the camera to take at least one picture of the environment to aid in identifying a party who activated the playback button.

While activating a playback button such as a BOB button has been described as causing a stored snippet to be played back, activating a playback button may instead cause other events to occur without departing from the spirit or the scope of the disclosure. For instance, when a party activates a playback button, a text transcript of the stored snippet may be made and sent to the party, e.g., as inline text in an email message or as a file attached to the email message. Alternatively, activating the BOB button may cause the stored snippet to be provided to the party as a voicemail message or as an audio file.

Access to a stored snippet may generally be provided substantially automatically upon a determination that playback is requested. It should be appreciated, however, that in some embodiment, an authentication process may occur prior to access being provided to a stored snippet. For example, if access to a snippet is provided by sending an email that includes a file that contains the snippet, the file may be password protected such that substantially only a party who has knowledge of the password may open the file.

In one embodiment, a playback button such as a BOB button may be utilized to effectively activate a continuous recording and storing function. That is, the use of a playback button may allow for the storage of more than a capture interval. By way of example, if a playback button has been activated more than a predetermined number of times within a particular time interval, a continuous recording and storing function that stores more than a capture interval may effectively commence. Storing more than a capture interval may include, but is not limited to including, storing substantially all interactions within an environment that occur after the continuous recording and storing function has been activated. It should be appreciated that activating a continuous recording and storing function may include allocating additional storage capacity, e.g., memory.

While the playback of a snippet may occur at full speed, i.e., at an actual speed such that one second of the snippet is substantially equal to one second of time, the playback of a snippet is not limited to occurring at full speed. For example, the playback of a snippet may be sped up and/or slowed down, as desired by a party listening to the snippet.

The embodiments may be implemented as hardware and/or software logic embodied in a tangible medium that, when executed, is operable to perform the various methods and processes described above. That is, the logic may be embodied as physical arrangements, modules, or components. A tangible medium may be substantially any suitable physical, computer-readable medium that is capable of storing logic which may be executed, e.g., by a computing system, to perform methods and functions associated with the embodiments. Such computer-readable media may include, but are not limited to including, physical storage and/or memory devices. Executable logic may include software logic, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. By way of example, while initiating a playback of a capture or snippet has been described as occurring in response to a request to playback the capture or snippet, providing a party with a file that contains the capture may instead occur in response to a request to playback the capture or snippet. In one embodiment, after a playback of a capture or a snippet is completed, a party that listened to the playback of the snippet may substantially permanently save the snippet, may request a text transcript of the snippet, and/or may request that a file containing the snippet be provided to the party. Therefore, the present examples are to be considered as illustrative and not restrictive, and the examples is not to be limited to the details given herein, but may be modified within the scope of the appended claims.

What is claimed is:

1. A method comprising:

monitoring activity in an environment, the activity being audio activity, wherein monitoring the activity in the environment includes operating a device, the device being arranged to capture the activity during a first time interval, the first time interval being between a first time and a second time;

storing a snippet of the activity, the snippet having a particular duration, the snippet being arranged to end at the second time, wherein storing the snippet of the activity includes storing the snippet in a storage module;

determining when a request to provide the snippet is obtained from a party;

accessing the storage module to obtain the snippet when it is determined that the request to play the snippet is obtained from the party, wherein the request to provide the snippet is obtained at the second time; providing the snippet to the party if it is determined that the request to provide the snippet is obtained;

and activating a recording and storing function that stores more than the particular duration when it is determined that more than a particular number of requests to provide a snippet have been obtained within a particular time interval.

2. The method of claim 1 wherein the activity includes sounds, and wherein storing the snippet of the activity includes storing at least some of the sounds.

3. The method of claim 2 wherein storing the sounds in the storage module includes updating the snippet to include recent ones of the sounds, the recent ones of the sounds being arranged to end at the second time, and wherein the particular duration of the snippet is measured from a time after the first time.

4. The method of claim 2 wherein the device includes a user interface arrangement and a microphone arranged to capture the sounds, and wherein determining when the request to provide the snippet is obtained includes determining if the user interface arrangement is activated.

5. The method of claim 1 wherein providing the snippet to the party includes playing the snippet on a speaker arrangement included in the device.

6. The method of claim 1 wherein substantially only the snippet is stored in the storage module.

7. The method of claim 1 wherein the representation of the snippet is a text transcript generated using content of the snippet.

8. The method of claim 1 wherein the device is a phone and wherein monitoring the activity in the environment includes operating the device to record the activity between the first time and the second time.

9. A non-transitory tangible computer-readable medium comprising logic, the logic, when executed, configured to:
monitor activity in an environment, the activity being audio activity, wherein the logic configured to monitor the activity in the environment is operable to cause the activity to be captured between a first time and a second time;
store a snippet of the activity, the snippet having a particular duration, the snippet being arranged to end at the second time, wherein the logic configured to store the snippet is operable to store the snippet in a storage module;
determine when a request to provide the snippet is obtained from a party; access the storage module to obtain the snippet when it is determined that the request to play the snippet is obtained from the party, wherein the request to provide the snippet is obtained at the second time;
provide the snippet to the party if it is determined that the request to provide the snippet is obtained;
and activate a recording and storing function that stores more than the particular duration when it is determined that more than a particular number of requests to provide a snippet have been obtained within a particular time interval.

10. The logic of claim 9 wherein the activity includes sounds, and wherein the logic configured to store the snippet of the activity is operable to store at least some of the sounds.

11. The logic of claim 10 wherein the logic configured to store the sounds in the storage module is operable to update the snippet to include recent ones of the sounds, the recent ones of the sounds being arranged to end at the second time, and wherein the particular duration of the snippet is measured from a time after the first time.

12. The logic of claim 10 wherein the device includes a user interface arrangement and a microphone arranged to capture the sounds, and wherein the logic configured to determine when the request to provide the snippet is obtained is operable to determine if the user interface arrangement is activated.

13. The logic of claim 9 wherein the logic configured to provide the snippet to the party is operable to cause the snippet to be played out on a speaker arrangement.

14. An apparatus comprising:
means for monitoring activity in an environment using a telephone device, the activity being audio activity, the telephone device being arranged to capture the activity between a first time and a second time;
Means for storing a snippet of the activity, the snippet having a particular duration, the snippet being arranged to end at the second time, wherein the means for storing the snippet of the activity include means for storing the snippet in a storage module associated with the telephone device;
means for determining when a request to provide the snippet is obtained from a party;
means for accessing the storage module to obtain the snippet when it is determined that the request to play the snippet is obtained from the party, wherein the request to provide the snippet is obtained at the second time; means for providing the snippet to the party if it is determined that the request to provide the snippet is obtained; and
means for activating a recording and storing function that stores more than the particular duration when it is determined that more than a particular number of requests to provide a snippet have been obtained within a particular time interval.

15. An apparatus comprising:
a first module, the first module being arranged to capture activity in an environment between a first time and a second time, the activity being audio activity, the first module being arranged to store a snippet of the activity in the storage module, wherein the snippet has a particular duration that ends at the second time and begins after the first time;
and an activation module, the activation module being arranged to determine when a request to access the snippet is obtained, the activation module further being arranged to cooperate with the first module and the storage module to provide the access to the snippet when it is determined that the request to access the snippet is obtained, wherein the request to access the snippet is obtained at the second time and to activate a recording and storing function that stores more than the particular duration when it is determined that more than a particular number of requests to provide a snippet have been obtained within a particular time interval.

16. The apparatus of claim 15 wherein the first module includes a microphone and the activity includes sound, the microphone being arranged to capture the sound.

17. The apparatus of claim 16 wherein the apparatus is a phone device.

18. The apparatus of claim 16 wherein the apparatus includes a speaker arrangement, the first module being arranged to provide the access to the snippet by outputting the snippet using the speaker arrangement.

19. The apparatus of claim 16 wherein the first module is arranged to provide the access to the snippet by generating a text transcript associated with the snippet.

20. The apparatus of claim 16 wherein the first module is arranged to provide the access to the snippet by transmitting the snippet.

\* \* \* \* \*